United States Patent Office 3,474,717
Patented Oct. 28, 1969

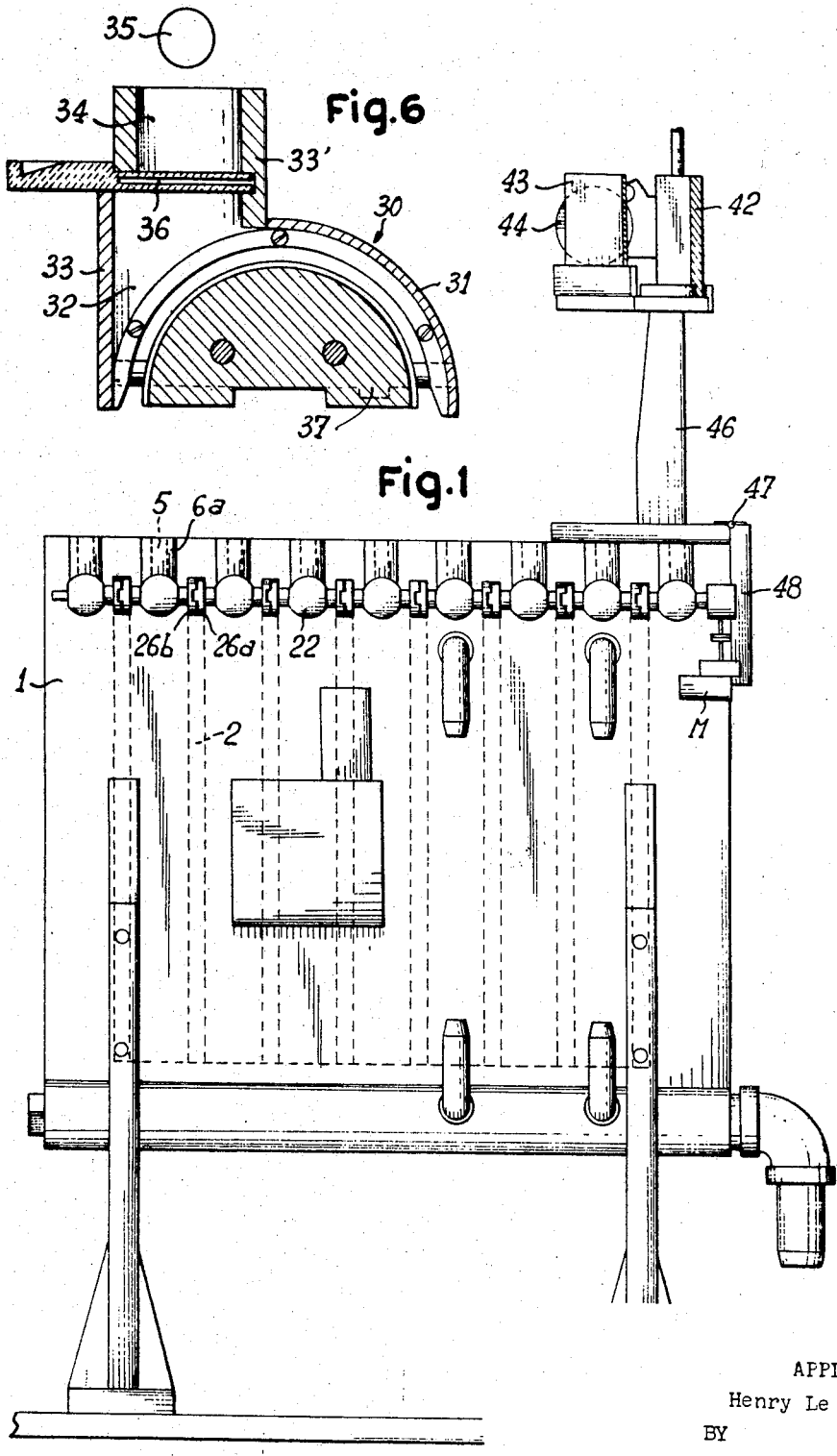

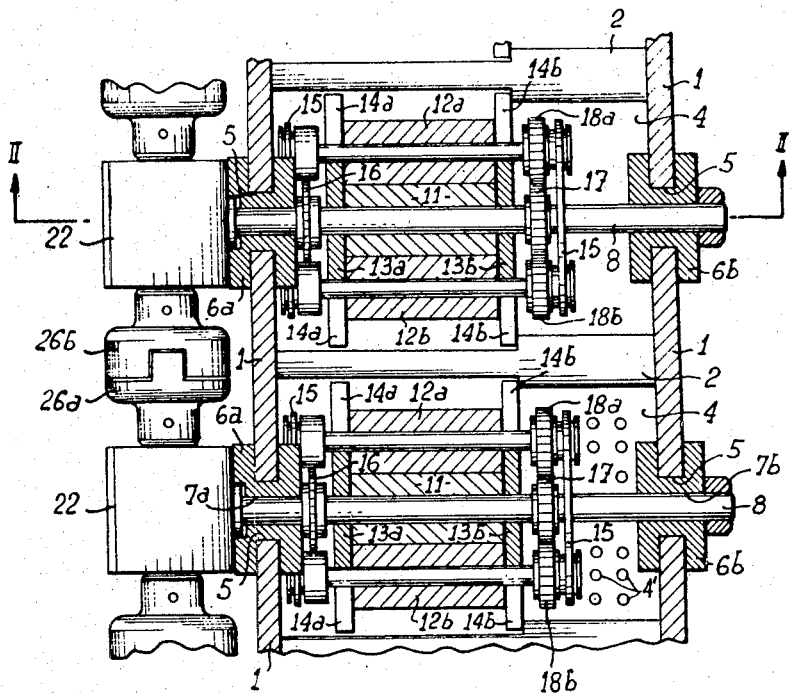
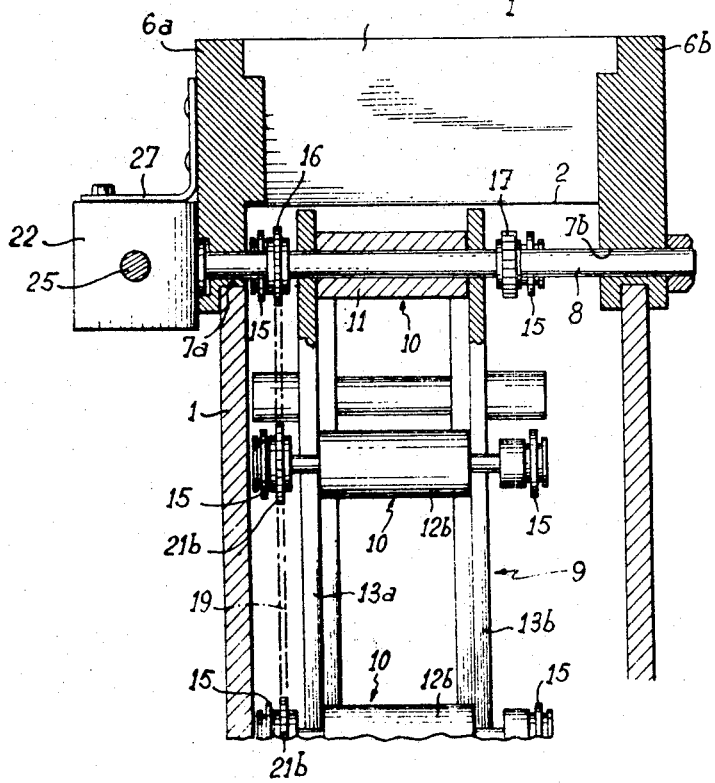

3,474,717
INSTALLATIONS FOR PROCESSING SENSITIVE SURFACES
Henri Le Bey, Paris, France, assignor to Societe dite: Photomaton G.C., Paris, France, a company of France
Filed Sept. 30, 1966, Ser. No. 583,353
Claims priority, application France, Oct. 1, 1965, 33,487/65; July 6, 1966, 68,373/66
Int. Cl. G03d *3/12*
U.S. Cl. 95—94                 6 Claims

ABSTRACT OF THE DISCLOSURE

Photographic apparatus having a processing tank separated by a plurality of compartments. Each compartment comprises a motor driven conveyor system which enables the film to pass successively through the compartments. A gear box fixed to each compartment is provided with a motor shaft section which is drivably coupled to the driving shaft of each of the conveyor systems and with the motor shaft section of adjacent compartments. A film transfer bridge straddled between two adjacent compartments enable film to pass from one compartment to another. An optical system consisting of three mirrors is employed to enable the image to be rectified and the optical path to be lengthened.

---

This invention relates to installations for processing sensitive surfaces of the kind comprising a tank separated by partitions into a plurality of compartments, and driving means which enable an image-carrying sensitive surface or film to pass successively through the compartments where it undergoes the appropriate successive treaments.

In tanks of this kind, the means by which the film is driven are generally formed in each compartment by a conveyor comprising several groups of three tangential rollers which are situated in a common horizontal plane and which are kept in contact with one another by a suitable resilient means. The rollers of one compartment are rotated by a chain engaging with sprocket wheels integral with certain of the rollers. The chain itself is driven through a sprocket mounted on a driving shaft which extends across the tank, being mounted in two bearings provided in the walls of the tank. A motor shaft extending at right-angles to the driving shafts rotates the driving shafts by way of an endless screw and gearwheels. The motor shaft is itself driven in any manner, for example by an electric motor.

An arrangement of this kind operates satisfactorily although it is not easy to dismantle and reassemble when it is desired to clean the compartments of the tank and the conveyors accommodated in them which have to be completely removed from their respective compartments in order to be properly cleaned.

An object of the invention is to obviate this disadvantage.

According to one aspect of the invention, there is provided a processing tank which is divided into a plurality of compartments by vertical partitions, and in the sides of which are formed slots distributed in such a way that each compartment comprises at least one pair of slots opposite one another, which slots are intended to receive bearings which act as supports for driving shafts of a film conveyor system in each of the compartments, and of which the cross-section is substantially in the form of an H enabling them to be fixed to the tank simply by engagement in the said slots, gear boxes being fixed to the bearings of each compartment situated on one side of the tank and being provided with an opening into which extends one end of the driving shaft of the corresponding conveyor system, the said gear boxes further being traversed by a short, perpendicular motor shaft section which, at its two ends, carries means by which it can be coupled with the indentical motor shaft sections of the adjacent compartments, a bevel gear mechanism being housed in each of the said gear boxes to transmit the movement of the motor shafts to the associated driving shaft in such a way that the whole of a conveyor system, including its driving shaft and the associated transmission box, can be removed from the tank without having to be dismantled beforehand, and independently of the rest of the system by a simple upward sliding movement.

The means for coupling the motor shaft sections together are preferably in the form of dog clutches so that, by suitable angular orientation of the motor shaft, the dogs engage or disengage during the upward sliding movement by which the units associated with one compartment are removed.

The bevel gear mechanism housed in each gear box preferably comprises two bevel gears, one of which is mounted on the driving shaft and the other on the motor shaft section, both these bevel wheels remaining permanently in contact in such a way that the movement is always transmitted under excellent conditions.

To enable the film to pass from one compartment to the other, there are provided on the upper part of the tank semispherical elements or bridges which straddle two successive compartments and which deflect the film through 180° whilst guiding it by its edges. Since a processing tank of this kind can be used to develop special films, for example colour photographs, the film may have to be illuminated at a given moment during its processing.

For this purpose, there may be used (as known per se) a lighting bridge combining the functions of guiding the film during its passage from one compartment to the next, with the function of lighting the film travelling through the bridge. One such bridge is in the form of a semi-cylindrical surface comprising an opening substantially in the form of a quarter circle in cross-section, being defined by vertical walls forming a channel through which passes the light emanating from a lamp, preferably a fluorescent lamp, compatible with the requisite colour temperature, and which is in addition equipped with filters for balancing the light with the sensitometric curves of the emulsion of the film to be processed.

In the case under discussion, namely the processing of a film producing colour photographs, it is generally advisable to keep the temperature of the baths accommodated in certain of the compartments at an almost constant level. For this purpose, radiator tubes through which hot water circulates in a closed circuit, and which outside the tank pass through thermostat, are immersed in the baths. In addition, it is also necessary to dry the film having undergone the necessary treatment in the different compartments of the tank.

According to another aspect of the invention, the film is dried by passing it through an additional compartment comprising a conveyor identical with those of the preceding compartments, although it does not contain any liquid, through which flows a strong current of hot air delivered for example by a fan which blows the air across a heated electrical resistance. The current of hot air is removed from the machine through a shaft so that it is not able to affect temperature control of the processing baths.

A processing installation embodying the improvements hereinbefore discussed, considered together or in combination, offers particular advantages in the processing of films producing coloured images in photographic machines of the kind used to take identity photographs in booths fitted out for this purpose, which produce photographs in a matter of minutes.

In the case of processing installations producing colour photographs, however, it is preferred to use lenses with a longer focal length than the lenses used for producing black and white photographs. Since, however, the size of the booths cannot be altered, it is important to modify the optical systems which have so far been in use. In view of the fact that the technique used does not provide for a negative to be transferred to a proof, the image has to be rectified before it reaches the sensitive surface. Until now, such rectification has been carried out by complex optical systems consisting of coupled prisms which do not enable lenses of greater focal length to be used, and which distort the image quite considerably.

According to the invention, the image is rectified by an optical system consisting of three mirrors which simultaneously enable the image to be rectified and the optical path to be lengthened to accommodate lenses of greater focal length, without distorting the image in any way.

According to the invention, this optical system is advantageously mounted on a support fixed to the development tank by way of a hinge in such a way that the upper part of the tank can be uncovered by pivoting the optical unit.

In order to improve the artistic quality of the photograph, the optical unit is elevated in relation to the level of the subject to be photographed, and at the same time is inclined in such a way that the aiming point is still substantially at the level of the subject's mouth.

Accordingly, the support on which the optical system is mounted is raised and included slightly downwards.

The optical system is preferably elevated by a distance at least substantially equal to the distance between the level of the eyes and the level of the mouth, i.e., at least 8 cm. The angle at which the optical system is inclined is thus determined in dependence upon the distance separating the optical unit from the subject, with the condition that the aiming point is substantially on the mouth of the subject to be photographed.

According to another aspect of the invention, the optical system is even further elevated in order to make the subjects to be photographed, particularly if they are tall, more comfortable in the booth. In this way, the aiming point is raised in relation to the location of previous aiming points, when the level relative to the ground is considered, although it is still at the level of the mouth of the subject to be photographed.

It has been found that the artistic quality of the identity photographs obtained is clearly improved by an optical system elevated and inclined in accordance with the invention.

Other features of the invention are discussed by way of example in the following description with reference to the accompanying drawings, wherein:

FIG. 1 diagrammatically illustrates a processing tank according to the invention in elevation.

FIG. 2 is a partial view of this tank as seen from above on a larger scale.

FIG. 3 is a section through FIG. 2 on the line III—III.

FIG. 6 is a cross-section through a lighting bridge given by way of example.

Figure 4:
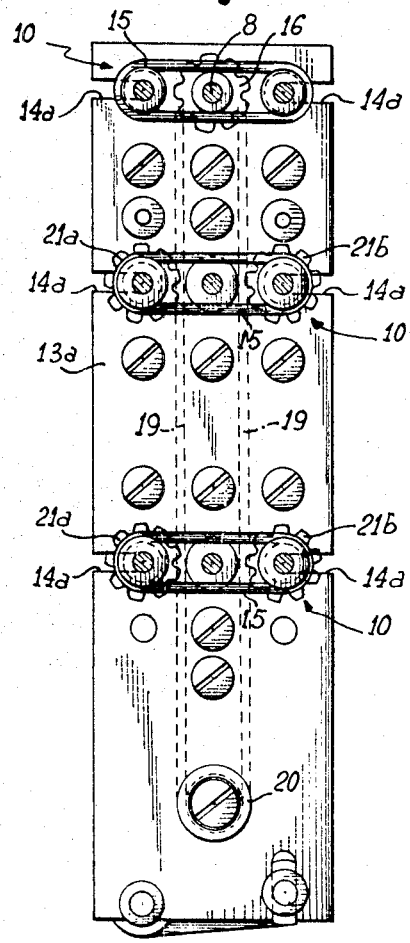
FIG. 4 is a side elevation of a film conveyor belonging to the tank.

The processing installation shown in FIGS. 1 to 5 essentially comprises a tank 1 whose horizontal section is in the form of an elongated rectangle. Partitions 2 parallel to the walls 3 divide this tank into a plurality of compartments 4 which contain the various products or reactants necessary for processing the film on which an image has already been produced. In order to bring these various compartments to, and keep them at, a temperature suitable for processing the films, each is provided with a group of U-tubes diagrammatically ilustrated at 4' in FIG. 2, through which flows a stream of water or of any other suitable liquid heated to a suitable temperature regulated by a thermostat.

Slots 5 are formed in the sides of the long walls of the tank 1 at the centre, or substantially at the centre, of each wall section defining a compartment 4. Each compartment thus has two slots 5 opposite one another. The function of these slots is to accommodate front and rear bearings 6a and 6b whose horizontal section is substantially in the form of an H, thus enabling them to be engaged in the slots 5, as shown quite clearly in FIG. 2. No other system is required for securing the bearings to the tank. They are in effect "embedded" in the walls of the tank although they can be removed from it quite easily by an upward sliding movement. The bearings 6a and 6b are drilled at 7a and 7b, respectively, to enable a shaft 8 to pass through them.

Movement of the film in each of the compartments 4 is provided by a conveyor mechanism 9 consisting of several vertically adjacent groups 10, for example three in number, of three rollers with horizontal axes 11, 12a and 12b arranged tangentially side by side. The shafts which carry these rollers extend through two vertically parallel plates 13a and 13b which act as supports for them and which in turn are carried by the shaft 8 which thus supports the whole of the transporter or conveyor mechanism 9.

The film enters each compartment 4 from the top, passes between the rollers 11 and 12b of the upper group 10 and then between the rollers of the group 10 arranged beneath and so on, and rises by passing between the rollers 11 and 12a of each group 10. A conventional guide means in the form of a semi-spherical bridge straddling two compartments guides the film by its edges by deflecting it through 180° for its passage from one compartment to another. These guide means are fitted to the tank and accordingly can easily be removed from it.

For the film to be driven by the rollers, the rollers themselves must be in close contact with one another. To this end, the shafts of the two outer rollers of each group 10 are mounted in horizontal slots 14a and 14b formed in the plates 13a and 13b, respectively, whilst the rollers 12 are pressed against the roller 11 by elastic means, for example in the form of rubber bands 15 looped around pulleys mounted at the ends of these shafts. It is also possible by virtue of this arrangement readily to remove the rollers 12, for example in order to clean them because it is sufficient merely to remove the rubber bands 15 and to slide the shaft of these rollers outwards in the slots 14.

FIG. 4, which is an external side elevation of one of the conveyor mechanisms from the side of the plate 13a, shows quite clearly how the various rollers are rotated. The shaft 8 is driven in a manner which will be described further on. On either side of the plates 13a and 13b it carries a sprocket wheel 16 and a gearwheel 17. The gearwheel 17 meshes with similar wheels 18a and 18b mounted on the shafts of the adjacent rollers 12. Passing around the sprocket wheel 16 is a chain 19 which, in the lower section of the conveyor, also passes around a pulley 20 mounted on a spindle which carries a roller around which the film passes following its passage through the lowest group of rollers 10. The spindles of the rollers 12a and 12b carry sprocket wheels 21a and 21b which cooperate with the chain 19, thus driving the aforementioned spindles. The rollers 11 are friction driven by means of the rubber bands 15 which ensure permanent contact with the rollers 12.

The shafts 8 which perform the twin function of supporting and driving the conveyor with which they are associated, should of course all rotate at the same speed. For this purpose, a single motor M is used to control the shafts 8, the movement of this motor being transmitted to each of them through appropriate mechanisms.

Each such mechanism comprises a housing or box 22 in which are two bevel gears 23 and 24 (FIG. 5) the first of which is mounted on the end of the shaft 8 and the other on the short shaft section 25 extending through the box 22 which acts as a bearing for this shaft 25 and is fixed to the bearing 6a in any suitable manner, for example by means of an angle bracket 27. At each of its ends, outside the box, the shaft 25 carries a dog element 26a, 26b which enables it to be connected or coupled with the shafts 25 associated with the adjacent compartments. When the shafts 25 are in an angular position so that the dog elements are oriented as shown in FIG. 2, the shafts can be connected and disconnected by straightforward vertical translation. The motor shaft consisting of the series of interconnected shaft sections 25 is driven directly or indirectly by the single control motor whose shaft may comprise for example a dog element enabling it to be coupled with the shaft 25. Since the bevel gear mechanism forms a compact unit in which the gears 23 and 24 are always in engagement, the movement of the motor is effectively transmitted to the conveyors without any noise.

Figure 5:
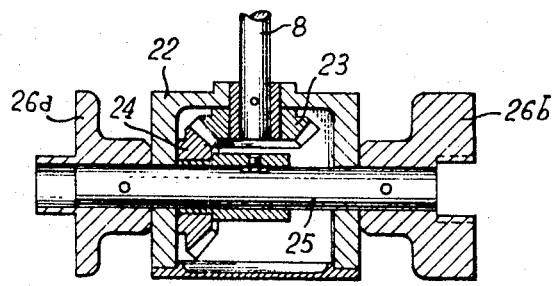
FIG. 5 is a section on a larger scale through a transmission system forming part of the installation.

In view of the fact that the conveyor 9 is supported solely by the shaft 8 which is itself supported by bearings 6a and 6b, the first of which is integral with the transmission system as shown in FIG. 5, it will be appreciated that this assembly as a whole can be removed and separated without difficulty from the compartment with which it is associated independently of the similar, adjacent assemblies. It is sufficient to pull it vertically upwards in which case the bearings 6a and 6b slide in the notches 5, whilst the dog elements (suitably oriented beforehand) also slide relative to one another, thus producing disengagement. The assembly can be installed just as simply and quickly.

The tank which has just been described, together with its accessories, may be used whatever type of treatment is applied to the film. However, for the development of special films, for example directly producing coloured photographs, it may be necessary to expose the film to light at a given moment during its processing.

For this purpose, a bridge of the kind shown in FIG. 6 may be used. It combines the functions of guiding the film during its passage from one compartment to the other with the function of illuminating the film passing through the bridge. One such bridge 30 is a movable component as wide as the tank which is placed in position simply by securing it to the upper part of the tank so that it straddles two compartments. It comprises a semispherical surface 31 formed with an opening 32 which is substantially in the form of a quarter circle in cross-section and which is defined by vertical walls such as 33 and 33′ forming a substantially parallelepipedic channel 34 through which passes the light emanating from a lamp diagrammatically illustrated at 35, preferably a fluorescent or filament lamp with a condenser inbetween. This channel is also equipped with interchangeable filters 36 in order to balance the light with the sensitometric curves of the emulsion of the film to be processed. In addition, the bridge may comprise a central hub 37 coaxial with the surface 31 to co-operate simultaneously with the film, assisting its guidance, and with the remainder of the bridge to stabilize the assembly.

When the tank is designed to be used for the purpose mentioned above, namely for processing films from which colour photographs can be directly produced, a final compartment is provided for drying the film. Through this compartment which is also provided with a conveyor there passes, preferably in countercurrent to the film, a strong current of hot air delivered, for example, by a fan which blows the air across a heated electrical resistance. The hot air is removed from the machine through a shaft so that it is not able to affect temperature control of the processing baths.

Figure 7:
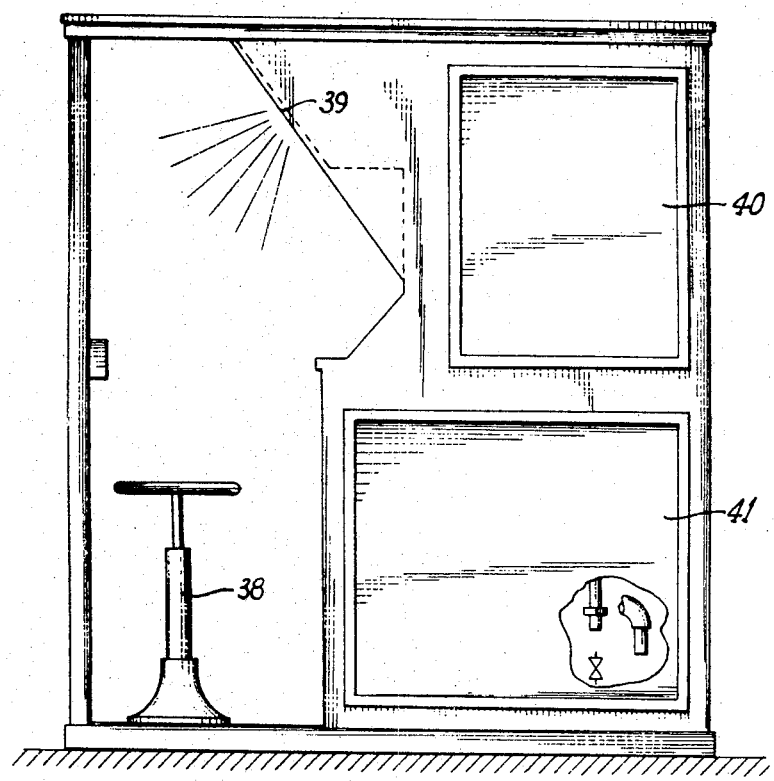
FIG. 7 is an elevation of a photographic booth in which a processing installation of the kind shown in the preceding figures can be installed.

A processing installation embodying the improvements described in the foregoing and considered separately or in combination, is particularly advantageous in photographic machines of the kind used for taking identity photographs in booths. One such booth is diagrammatically illustrated in FIG. 7 which is a side elevation. It comprises a stool 38 of adjustable height and a combined photographing and development system which automatically produces photographs in a matter of minutes. More particularly this system comprises a section 39 which illuminates the person to be photographed, advantageously by flashes, an optical system generally denoted by the reference 40 and a film-processing section generally denoted by the reference 41. This last section is advantageously of the kind described in the foregoing, particularly for the production of coloured photographs. In this event, however, it is of advantage to use an optical system modified in relation to the previous system insofar as it comprises a lens of greater focal length. It is possible to lengthen the optical path without modifying the general markings of the booth. Since, on the other hand, the optical system has to rectify the image before the film is printed, in view of the fact that photographs are directly produced on a positive without the intermediary of a negative, the system according to the invention also enables such rectification to be carried out.

Figure 8:
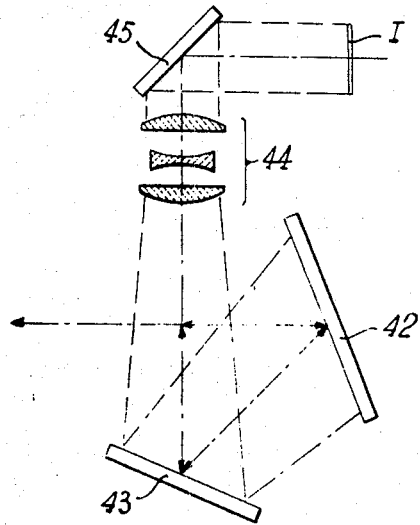
FIG. 8 is an optical diagram of a rectifying system according to the invention.
Figure 9:
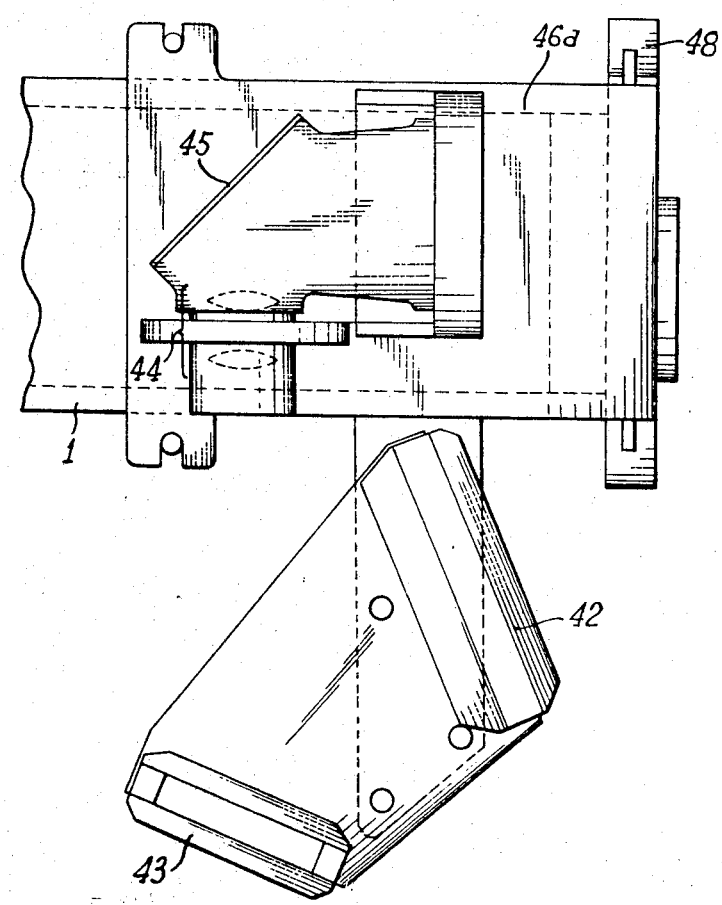
FIG. 9 is a view from above of the optical unit supported by a processing tank.

Such an optical system is diagrammatically shown in FIG. 8 and comprises three plane mirrors between the object plane and the image plane I. More precisely, a first mirror 42 reflects the optical axis through 45° on to a second mirror 43 which also reflects it through 45° in such a way that the optical axis is at 90° in relation to the preceding axis. On this new axis, there is arranged a lens system 44 followed by a mirror 45 reflecting through 90° towards the image plane I in which the sensitive surface is located. An optical system of this kind can be made in one piece as shown in FIG. 9.

It is advantageously mounted on a support 46 which is itself pivotally connected through a hinge 47 to a fixing element 48 integral with the film-processing tank. The lower part 46a and the support 46 rests normally on the top of the tank. In case it is necessary to uncover the upper part of the tank, the support 46 merely has to be pivoted, together with the optical "block" it carries, about the hinge 47. In this way, repositioning of the optical block does not involve adjustment since the support merely has to be pivoted in the opposite direction to return it to its normal position.

What I claim is:

1. An installation for processing sensitive film surfaces, comprising:

a tank;

compartments delimited in the tank by parallel vertical partitions in the tank and by wall sections of two opposite walls of the tank for containing the various products necessary for processing the film;

for each compartment a film conveyor system for moving the film in the compartment, said conveyor system being supported and driven by a driving shaft supported by two opposite H-shaped bearings, said bearings being engaged in two opposite and upwardly opening slots formed in the said wall sections which delimit the compartment, and said bearings being removable from the slots by an upward sliding movement;

for each compartment a gear box supported by one of said bearings and into which extends one end of the said driving shaft of the compartment, the said boxes of the compartments being all on the same side of the tank;

and for each said box, a motor shaft section traversing the box perpendicularly to the said driving shaft which extends into the box, said motor shaft section being drivably coupled to said driving shaft through a bevel gear mechanism contained in the said box and being coupled with the identical motor shaft sections of the adjacent compartments.

2. An installation as claimed in claim 1, wherein said film conveyor system comprises a plurality of horizontal and parallel film driving roller shafts carried by two vertically parallel plates supported by said driving shaft, said driving shaft and said roller shafts being rotatably coupled by coupling means mounted on the driving shaft and on the roller shafts.

3. An installation as claimed in claim 1, wherein said means for coupling the motor shaft sections together are dog elements which, for a suitable angular orientation of the motor shaft, disengage one from another during the said upward sliding movement.

4. An installation as claimed in claim 1, wherein each bevel gear mechanism housed comprises two bevel wheels, one of which is mounted on the said motor shaft section and the other one is mounted on the said driving shaft, these two wheels remaining permanently in contact so that the movement is always transmitted under excellent conditions.

5. An installation as claimed in claim 1, and further comprising between two adjacent compartments a film transfer bridge straddling the partition which separates said compartments, said bridge being provided with a channel for passing to the film the light emanating from a lamp.

6. An installation according to claim 1, and further comprising an optical system consisting of three plane mirrors for rectifying the image before being fixed on the sensitive surface, the optical system being in one piece fixed to a support which is itself mounted on the film processing tank by means of a hinge and also being mounted on an elevated support inclined in such a way that the optical block is substantially level with the eyes of the subject to be photographed, while the aiming point is substantially on the mouth of the subject.

References Cited
UNITED STATES PATENTS

| | | | |
|---|---|---|---|
| 1,825,709 | 10/1931 | Bacino | 95—14 |
| 2,183,742 | 12/1939 | Hershberg | 95—14 |
| 2,192,755 | 3/1940 | Rabkin et al. | 95—14 |
| 2,541,016 | 2/1951 | Allen | 95—14 |
| 2,796,812 | 6/1957 | Koci | 95—1.1 |
| 2,940,358 | 6/1960 | Rosenthal | 88—24 |
| 3,285,150 | 11/1966 | Wunderle | 95—94 X |

NORTON ANSHER, Primary Examiner

CHARLES E. SMITH, Assistant Examiner

U.S. Cl. X.R.

95—14, 89, 96